United States Patent [19]

Smith et al.

[11] 3,726,933

[45] Apr. 10, 1973

[54] ALKALINE EARTH METAL ORGANOMETALLIC COMPOUNDS AND METHOD FOR MAKING THE SAME

[75] Inventors: Richard R. Smith, Cuyahoga Falls; Stuart D. Nielsen, Stow, both of Ohio

[73] Assignee: The General Tire & Rubber Company, Akron, Ohio

[22] Filed: Jan. 18, 1971

[21] Appl. No.: 107,524

[52] U.S. Cl. ..........260/665 R, 252/431 R, 260/84.1, 260/88.7 E, 260/89.5 A, 260/89.7 R, 260/91.1 R, 260/91.7, 260/93.5 R
[51] Int. Cl. ............C07f 3/02, C07f 3/04, C07f 3/00
[58] Field of Search .....................260/665 R, 665 G, 260/335

[56] References Cited

UNITED STATES PATENTS

| | | | |
|---|---|---|---|
| 2,788,377 | 4/1957 | Barber | 260/665 G |
| 2,835,712 | 5/1958 | Ziegler | 260/665 G |
| 3,365,404 | 1/1968 | Bailey et al. | 252/431 R |
| 3,509,067 | 4/1970 | Bostick | 260/665 R |
| 3,535,355 | 10/1970 | Jolly et al. | 260/665 R |

OTHER PUBLICATIONS

Fischer et al., Chem. Benchte. 94(1961) p. 2187–2192.
Nesmeyanov et al., Methods of Element–Organic Chemistry, Vol. 2, 1967, North Holland Pub. Co. Amsterdam, p. 684, 688, 689, 690, 694.

*Primary Examiner*—Patrick P. Garvin
*Assistant Examiner*—A. P. Demers
*Attorney*—Frank C. Rote, Jr., Denbigh S. Matthews and John J. Murphey

[57] ABSTRACT

Orgoanometallic compounds of high carbanion yield are prepared by metallation with alkaline earth metals such as beryllium, barium, strontium, magnesium, calcium or radium or mixture of the same of certain acidic organic compounds having a pKa value of from about 15 to 35 on the MSAD scale in the presence of protic polar solvents, e.g., barium dissolved in monomethyl amine and reacted with triphenyl methane to yield trityl barium. Such organometallic compounds formed by metal-hydrogen exchange reaction are useful in initiating anionic growth-type polymerization of monomers, e.g., alkylene oxides and vinyl compounds, to form homopolymers and copolymers. The persistence of polymer carbanions created by such catalysts makes possible the controlled preparation of a variety of polymers, including block and telechelic polymers.

11 Claims, No Drawings

ALKALINE EARTH METAL ORGANOMETALLIC COMPOUNDS AND METHOD FOR MAKING THE SAME

BACKGROUND OF THE INVENTION

Field of the Invention

This invention relates to new organometallic compounds formed by metallation of weakly acidic organic compounds with alkaline earth metals such as barium, strontium and/or calcium metal in the presence of a protic polar amine solvent. The metallation reaction involves a metal-hydrogen exchange to create compounds in which metal is joined to an organic radical by an ionic carbon to metal bond. These compounds are active as polymerization catalysts in initiating anionic growth-type polymerization of various monomers, e.g., alkylene oxides, vinyl compounds or the like, to form homopolymers and copolymers.

Description of the Prior Art

It has long been known that organometallic compounds in which metal is joined to an organic radical through a carbon to metal bond may be prepared by a variety of methods. The Grignard reagents constitute a historic example of this type of compound. Tetraethyl lead and aluminum alkyl compounds are other examples of organometallic compounds having carbon to metal bonds which can be prepared quite readily in good yield and purity. Actually, the ready availability of aluminum alkyls has prompted their use as starting materials for formation of more complex organometallic compounds (see U. S. Pat. No. 3,360,537). A metal alkyl such as zinc diethyl has been used in metal interchange reaction for the preparation of organometallic compounds of strontium (see Gilman et al., J.A.C.S., 65, 268–1943). Alkaline earth organo-metallic compounds formed in this manner were found to have low solubility in organic solvents such as benzene (see Gilman et al., J.A.C.S., 67, 520–1945).

It is known that some hydrocarbons possess carbon-hydrogen groups which exhibit ionic-like properties forming groups which are referred to as carbanions. Such hydrocarbons exhibit an acidic like property which is stronger in the case of some hydrocarbons than with others. This has resulted in the development of an acidity scale by which the relative ease with which the hydrocarbon forms a carbanion is characterized by a pKa value on a McEwen - Streitwieser - Applequist - Dessy (M.S.A.D.) scale (see "Fundamentals of Carbanion Chemistry" by Cram, page 19, published 1965 by Academic Press). On this scale, the lower the pKa value for a hydrocarbon, the more acidic it is and the greater is the ease with which the hydrocarbon will form a carbanion.

Due to the highly basic nature and strong reactivity of alkali metals, formation of organometallic compounds of alkali metals with acidic type organic compounds can be readily accomplished. These can then be used in metal-hydrogen interchange reactions to form the corresponding organometallic compounds of other less reactive or less basic metals (see U. S. Pat. No. 3,450,728). Where it is desired to form organometallic compounds of less basic metals, e.g., alkaline earth metals, a technique for indirect metallation has been developed. Thus, by conducting a reaction of a metal with triphenyl methane or fluorene in excess liquid ammonia as a reaction medium under pressure and at a temperature of from −78° to 133°C., calcium hexammoniate which forms between calcium and the liquid ammonia will react with an acidic hydrocarbon to form an organometallic compound (see U. S. Pat. No. 3,365,404) which is useful in the polymerization of epoxide monomers.

Most aliphatic hydrocarbons do not have sufficient acidity to permit preparation of alkyl organometallic compounds from alkaline earth metals by direct metallation. Formation of such compounds by reaction of methyl iodine with barium, strontium or calcium has been conducted using pyridine as a reaction medium (see J.A.C.S., 80, 5324–1958).

Cyclopentadiene is a hydrocarbon exhibiting relatively high acidity i.e., it possesses a pKa value on the MSAD scale of 15. However, the hydrocarbon is not sufficiently "acid" to react with strong bases such as sodium hydroxide although it will react directly with sodium metal. In order to produce the calcium adduct of cyclopentadiene, the hydrocarbon has been reacted with calcium carbide using liquid ammonia or certain amines as accelerators for the reaction (see U. S. Pat. No. 2,835,712)

Organometallic compounds are known to be useful as catalysts for polymerization of a variety of polymerizable monomers. Actually, such adducts of metals vary in catalytic activity depending upon the metal present in the compound, the method of preparation of the adduct and its possible association in complexes with other materials. Such catalytic materials are of great commercial significance because they provide unique catalytic procedures, e.g., stereospecific polymerizations of the Ziegler-Natta type. Al, Be, Ca, Mg and Zn amide-alcoholate compounds have, for example, been used to polymerize monomeric cyclic carbonates (see U. S. Pat. No. 3,301,824). Epoxides have also been polymerized using complexes between organometallic compounds and alcohols (see U. S. Pat. No. 3,275,598), organometallic compounds and polyoxyalkylene glycols (see U. S. Pat. No. 3,427,259) or complexes of organometallic compounds with polar solvents (see U. S. Pat. No. 3,337,475). Also, barium and other group II–A metals have been treated with certain compounds like naphthalene to form radical ions or anions and used in the polymerization of isoprene, styrene and so forth: These barium compounds react as follows:

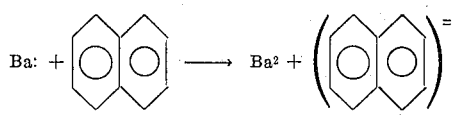

so that metallation of the naphthalene does not occur. Rather, complexes are formed by a transfer of electrons from the metal to the naphthalene which has a high electron affinity. See U. S. Pat. No. 3,509,067. The utility of organometallic compounds as catalysts in polymerization reactions and for other purposes would be further improved if organometallic compounds of alkaline earth metals could be created by less complicated procedures than available heretofore that would produce the organometallics in good yield and in a form in which the compound exhibits high carbanion content and catalytic activity.

OBJECTS

A principal object of this invention is the provision of new methods for producing organometallic compounds of alkaline earth metals. Further objects include the provision of:

1. New organometallic compounds of barium, calcium and/or strontium and certain acidic organic compounds.
2. New methods for the preparation of alkaline earth organometallic compounds by direct metallation of certain acidic organic compounds.
3. New catalytic materials useful in conducting homogeneous anionic polymerizations of vinyl compounds, oxirane compounds and other polymerizable monomers.
4. New polymerization methods in which a polymer carbanion is formed exhibiting persistent qualities upon which monomers may grow to form controlled-structure block copolymers.

Other objects and further scope of applicability of the present invention will become apparent from the detailed description given hereinafter.

SUMMARY OF THE INVENTION

These objects are accomplished according to the present invention by a metal-hydrogen exchange reaction between barium, strontium or calcium metal dissolved in a protic polar amine solvent and an acidic organic compound under substantially anhydrous conditions. Advantageously, the metal is employed in the stoichiometric amount needed to react with the acidic compounds. The formation of the organometallic compound is generally indicated by the appearance of a characteristic color associated with the formation of the carbanion. The resulting organometallic compounds contain a metal selected from the group consisting of barium, strontium and/or calcium in which the metal is joined to the organic moiety of the compound by an ionic carbon to metal bond. A preferred compound in accordance with the invention exhibiting unique polymerization catalytic activity is dixanthenyl barium. For example:

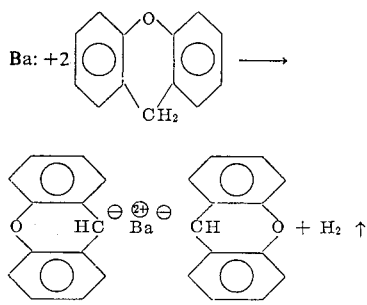

Here, a hydrogen atom from the organic compound is replaced with the metal to provide a mono-anion catalyst. To make a dianion catalyst or initiator, the following general reaction occurs (involving barium and a sym-tetraphenyl ethane):

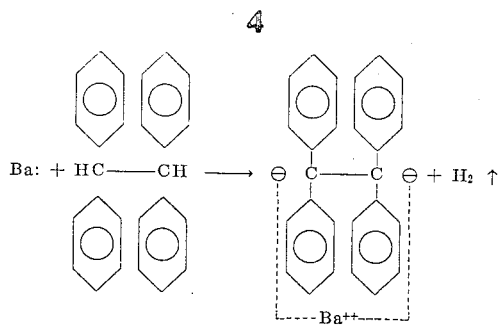

Here, two hydrogen atoms from the organic compound are replaced with the metal. More than two hydrogen atoms can also be replaced by the process of this invention.

The objects are further accomplished in accordance with the invention by compositions of matter useful as homogeneous anionic polymerization catalysts resulting from the aforesaid metallation reactions, which compositions comprise a solution or dispersion in aprotic polar solvent of an organometallic compound of an acidic organic compound having a pKa value on the MSAD scale of from about 15 to 35 and an alkaline earth metal preferably selected from the group consisting of barium, strontium, calcium and mixtures thereof, said metal being joined to the organic compound by an ionic carbon to metal bond.

The objects of the invention are further accomplished by polymerization of vinyl monomers, oxirane monomers or other polymerizable monomers by bringing the monomer into contact with a composition as aforesaid to form monomer organometallic adduct between a portion of the monomer and carbanion present in the catalytic composition, permitting further portions of monomer to grow onto such adduct and then terminating the resulting polymerization as desired. Such termination may be by addition of an active hydrogen compound such as an alcohol, an amine, water or other compound containing an active hydrogen permitting the added compound to combine with the growing polymer carbanion whereby further growth is terminated. Dixanthenyl barium or other organometallic compound in accordance with the invention, thus, creates a propagation center by reaction with polymerizable monomer from which active growth of further monomer portions proceeds in the absence of chain termination with progressive increase in molecular weight. Such active polymer metal gegenion is persistent in the absence of chain termination and permits dissimilar monomers to be added thereon to form block copolymers. By selection of the chain termination reagent, terminal functionality on the resulting polymers or block copolymers can be attained. For example, chain termination with epoxides or $CO_2$ provides polymer chains with terminal hydroxyl or carboxyl functionality. Such terminally functional polymers may be subsequently employed in post-polymerization reactions, e.g., reaction with polyisocyanates to form polyurethanes or polyamides.

The polymerizable vinyl monomers are those having an activated unsaturated double bond, for example, those monomers where adjacent to the double bond there is an electrophilic constituent (atom or radical) stronger than hydrogen and which is not easily removed by a strong base. Examples of such monomers are nitriles like acrylonitrile, methacrylonitrile; amides like acrylamide methacrylamide; acrylates and alkacrylates like methyl acrylate, ethyl acrylate, butyl acrylate, ethyl hexyl acrylate, octyl acrylate, methyl methacrylate, ethyl methacrylate, butyl methacrylate, methyl ethacrylate, ethyl ethacrylate, butyl ethacrylate, octyl ethacrylate; the alkaline earth metal salts such as the Ba, Ca and Sr salts of the acrylic and alkacrylic acids such as acrylic, methacylic and ethacrylic acid; the dienes such as butadiene, chloroprene, isoprene and dimethyl butadiene; and the vinyl benzenes like styrene, meta vinyl toluene, and para vinyl toluene and the like and mixtures of the same. The polymerizable oxirane monomers are those of carbon, hydrogen and oxygen and having a ring of two carbon atoms and one oxygen and which will readily open and polymerize to form polyethers. Examples of oxirane monomers which can be employed are ethylene oxide, propylene oxide, butylene oxide, isobutylene oxide, allyl glycidyl ether, crotyl glycidyl ether, isoprene monoxide, butadiene monoxide, vinyl cyclohexene monoxide and the like and mixtures thereof. These monomers have up to 14 carbon atoms and are free of groups which would destroy the catalyst.

The invention provides, therefore, a process for the preparation of catalyst material active for the anionic polymerization of monomers by reacting an alkaline earth metal in the presence of a protic polar amine solvent with xanthene or other acidic organic material as defined herein having a pKa value between 15 and 35 on the MSAD scale until an organometallic reaction product is formed.

An advantage of the present invention is that the use of polar protic amine solvents permits the preparation of organometallic compounds of high basicity; the significance of this finding is that for the low-polarity monomers (e.g. dienes, styrene, etc.), the more basic the carbanion, the more efficient it is as an initiator. Another advantage of the present invention is the ability to prepare highly basic dianionic initiators of the alkaline earth metals by a substitution reaction. The ability to prepare dianionic initiators from these metals leads to very interesting polymers, e.g., polydienes with both chain ends functional and having a unique microstructure as well as new block polymers containing polar monomer segments. Also one of the significant features of the present process is that the alkaline earth metal is highly soluble in liquid amine to provide a highly reactive form of the metal on which chemical reactions can be carried out. This same reactivity is not evident in the aprotic anionic solvents such as ethers, hydrocarbons, etc. The formation of most of the organometallics of alkaline earth compounds in the latter solvents goes very slowly when a substitution of hydrogen by metal is involved and the desired product is often accompanied by substances formed in side reactions.

Examples of acidic hydrocarbons that yield efficient monoanion catalysts or initiators are: xanthene, triphenyl methane, diphenyl methane, 1,3,3-triphenyl propene and fluorene, etc. Examples of acidic hydrocarbons that provide dianionic initiators are: acetylene, symtetraphenylethane, 1,1,4,4-tetraphenylbutane and so forth.

The catalysts of this invention cannot only be used to make, for example, homopolymers, but also copolymers and block polymers. To illustrate, where dixanthenyl barium is XBaX (a monocarbanion), A is styrene, B is butadiene, and PO is propylene oxide, the following reactions can occur:

1. $XBaX + 2nA \rightarrow XA_nBaA_nX$, generally a homopolymer;
2. $XA_nBaA_nX = 2nB \rightarrow XA_nB_nBaB_nA_nX$, generally a block polymer;
3. $XBaX + nA + nB \rightarrow X(...BAB-BAAA...)Ba(AABBAB....)X$, generally a copolymer or mixed polymerizate; and
4. $XBaX + 2nPO \rightarrow X(PO)_nBa(OP)_nX$.

Treatment of the homopolymer of (1) (and (2), (3) and/or (4)) with ROH where H is an acidic proton can result in a generally stoichiometric splitting of the polymer:

5. $XA_nBaA_nX + 2 ROH \rightarrow Ba(OR)_2 + 2XA_nH$.

Treatment of the homopolymer of (1) (and (2), (3) and/or (4)) with the coupling agents can maintain the chain length of the polymer obtained or provide long chain branching where the branches may be of the same or different polymeric chain characteristics. Examples of coupling agents are 1,2-dichloroethane, silicon tetrachloride, 2,2'2''-trichlorotriethylamine, maleic or phthalic anhydride,

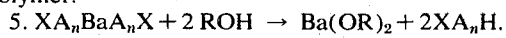

and other coupling agents and the like. For example,

6. $XA_nBaA_nX + ClCH_2CH_2Cl \rightarrow BaCl_2 + XA_nCH_2CH_2A_nX$. Different polymers can be treated with the coupling agents to get branches of different blocks.

Reaction of a polymer of the present invention with ethylene oxide (EO), propylene oxide or $CO_2$ and subsequent hydrolysis or ion exchange will provide a polymer having OH or COOH functionality.

7. $XA_nBaA_nX + 2EO \rightarrow XA_nEOBaOEA_nX$ ; $XA_nEOBaOEA_n + ROH \rightarrow 2XAn(EO)H + Ba(OR)_2$, and
8. $XA_nBaA_nX + 2CO_2 \rightarrow XA_nCOOBaOOCA_nX$ ; $XA_nCOOBaOOCA_n \xrightarrow{Hydrolysis}_{HCl} 2XA_nCOOH + BaCl_2$.

Where a dicarbanion is formed according to the present invention from barium ($Ba^{2+}$) and sym-tetraphenyl ethane ($Y^-$), e.g., $Ba^{2+} Y^-$, where A is styrene and B is butadiene, the following types of polymers and copolymers can occur: 9. $Y^-Ba^{2+} + 2nB \rightarrow \ominus B_n-Y-B_n\ominus Ba^{2+}$ (homopolymer)

10. $\ominus B_n-Y-B_n\ominus Ba^{2+} + 2nA \rightarrow \ominus A_nB_n-Y-B_nA_n - Ba^{2+}$ (block polymer)

11. $\ominus A_nB_n-Y-B_nA_n\ominus B_n^2 + \xrightarrow{2HOH} HA_nB_n-Y-B_nA_nH + Ba(OH)_2$ (removal of metal and stopping reaction)

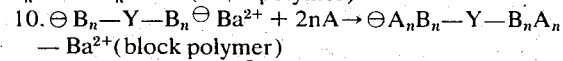
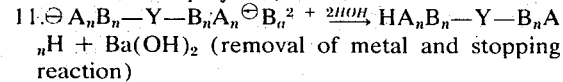

(long chain dicarboxylic acid useful in forming esters with alcohols or polyols or amides with isocyanates or polyisocyanates)

13. 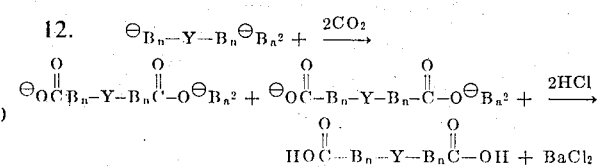

desired to cure or graft at the unsaturated sites, they can be hydrogenated to eliminate or essentially eliminate this unsaturation using hydrogen and a suitable catalyst (palladium or triisobutyl borane).

DESCRIPTION OF THE PREFERRED EMBODIMENTS

The following examples will serve to illustrate the present invention with more particularly to those (long chain glycol useful in reaction with mono or poly carboxylic acids to form esters or polyesters and with mono or polyisocyanates to form urethanes) Where the homo-, co-, or block polymers of the present invention contain unsaturation and it is not skilled in the art. In these examples and throughout the remaining specification and claims all parts and percentages are by weight unless otherwise specified. Also, in these examples all reactions and polymerizations were conducted in closed vessels under nitrogen, argon or neon (inert atmosphere).

EXAMPLE I

A quantity of 3 5/10 grams (0.0254 mole) of barium was dissolved in 250 ml. of liquid monomethyl amine at −78° C. which was contained in a vessel that was particularly immersed in a dry ice-isopropanol bath. At this point, the solution of metal as a deep blue color. After warming the solution to −50°C., 12.4g. (0.058 mole) of triphenylmethane was added to the solution. The blue color was immediately discharged and a red color appeared which deepened in color over the next half hour indicating that the reaction was complete. At this point, 100 ml. of hexamethyl phosphoric triamide was added to the solution and the monomethyl amine allowed to evaporate overnight. The deep red solution was filtered and analyzed by tritiation and the carbonbarium content found to be 0.321 meq./gm. of solution.

Examination of the reaction product by NMR indicated that no amine remained in the solution either as free amine or as a complex on the metal.

EXAMPLE II

A quantity of 8 2/10 grams (0.0450 mole) of xanthene was added to a solution of 3.08 grams (0.0225 mole) of barium in 250 ml. of liquid monomethyl amine at −50°C. After stirring 0.5 hour at −50°C., the color changed from blue to red indicating substantial completion of the reaction. 100 ml. of hexamethyl phosphoramide was added to the solution and the amine evaporated off overnight. The red solution was filtered and analyzed by tritiation and gave a carbon barium content of 0.424 meq./gram of solution.

Hydrolysis of a small sample of the above solution gave a sample which was examined by gas chromatography. Only xanthene was found in this sample which indicated that essentially no cleavage or other side reactions had occurred in the metallation reaction.

EXAMPLE III

A quantity of 3 51/100 grams (0.0255 mole) of barium was dissolved in 250 ml. of liquid monomethylamine at −78°C. After stirring 0.5 hours at −78°C., 8.51g. (0.0255 moles) of 1,1,2,2-tetraphenylethane was added. Immediately a red-brown color was observed indicating completion of the reaction.

TABLE I

| Run number | Catalyst, kind and amount | Monomer, kind and amount | Polymerization solvent | Temp., °C. | Time, days | Conversion of yield, percent | Remarks |
|---|---|---|---|---|---|---|---|
| 1 | Ditrityl barium, 1.6 g | Propylene oxide, 22.1 g | None | 80 | 6 | ~100 | Broad MWD with high MW shoulder. |
| 2 | Ditrityl braium, 5.36 g of an 0.15 molar sol'n in HMPA. | Propylene oxide, 19.3 g | do | 80 | 6 | ~100 | MWD narrower than Run 1 with tailing both ends. |
| 3 | Ditrityl barium, 1.42 g | Butadiene, 12.3 g | Benzene | 55 | 7 | | Mostly gel. |
| 4 | Ditrityl barium, 2.68 g | Butadiene, 12.0 g | do | 55 | 1 | | Gel. |
| 5 | Ditrityl barium, 3.0 ml. of an 0.16 molar sol'n in HMPA. | Styrene, 9.4 g | do | 30 | 1 | ~20 | Broad, bimodal MWD. |
| 6 | do | Styrene, 9.4 g | HMPA | 30 | 1 | >75 | Broad MWD with low MW tailing. |
| 7 | do | Butadiene, 11.3 g | HMPA | 50 | 1 | ~70 | Extremely broad, multi modal MWD, 10.5% trans, 83.5% vinyl. |
| 8 | do | Butadiene, 11.0 g | HMPA | 50 | 4 | >75 | Extremely broad, multi modal MWD, 16.6% trans, 83.4% vinyl. |
| 9 | Dixanthenyl barium, 3.0 ml. of an 0.212 molar sol'n in HMPA. | Styrene, 9.4 g | Benzene | 30 | 1 | ~95 | Broad MWD with extensive low MW tailing. |
| 10 | do | Styrene, 9.4 g | HMPA | 30 | 1 | ~80 | Do. |
| 11 | do | Butadiene, 12.3 g | HMPA | 50 | 1 | ~50 | Extremely broad, multi modal MWD, 15.8% trans, 84.2% vinyl. |
| 12 | Barium tetraphenyl ethyl dianion, 50 ml. of 0.002 molar sol'n in HMPA. | Styrene, 9.4 g | HMPA | 30 | 2 | ~99 | Very broad MWD, high MW polymer. |
| 13 | do | Butadiene, 12.3 g | HMPA | 50 | 2 | ~61 | Broad MWD, 18.2% trans, 3% cis, 78.8% vinyl. |
| 14 | Ditrityl barium, 3.0 ml. of an 0.16 molar sol'n in HMPA. | Styrene, 9.4 g. plus butadiene, 22.2 g. | HMPA | 50 | 2 | ~66 | Broad MWD with low MW shoulder, 42.8% sty; 57.2% BDN, 17.8% trans, 82.2% vinyl. |
| 15 | do | Styrene, 9.4 g. plus butadiene, 11.5 g. | HMPA | 50 | 2 | ~82 | Narrower MWD than Run 14, 51.3% sty; 48.7% BDN, 18.6% trans. |
| 16 | Dixanthenyl barium, 3.0 ml. of an 0.21 molar sol'n in HMPA. | Styrene, 9.4 g. plus butadiene, 11.4 g. | HMPA | 50 | 2 | ~98 | Broad MWD, long high MW tail, 49.8% sty; 50.2% BDN, trans, 18.6% cis, 2.8% cis, 78.6% vinyl. |

NOTES.—MWD=molecular weight distribution; MW=molecular weight; trans=trans-1,4; vinyl=vinyl-1,2; cis=cis-1,4; trityl=triphenyl methyl HPMA=hexamethyl phosphoric triamide or hexamethylphosphoramide.

After stirring an additional 1.5 hours at −78°C., about 100 ml. of hexamethyl phosphoramide was added and the amine allowed to evaporate off overnight.

The red-brown solution was filtered and analyzed by tritiation to contain a carbon-barium content of 0.004 meq./g. of solution.

EXAMPLE IV

A quantity of 0.97 grams (0.00706 mole) of barium was dissolved in 500 ml. of liquid monomethylamine at −78°C. After stirring one hour at −78°C., 5.0 g. (0.0128 mole) of 1,1,6,6-tetraphenylhexane was added. No color change occurred so the solution was allowed to slowly warm. At between −35°C. and −30° C. a color change to yellow was observed. After keeping the solution an additional three hours at between −35°C. and −25°C., about 100 ml. of hexamethyl phosphoramide was added and the amine allowed to evaporate off overnight.

The orange-red solution containing the barium 1,1,6,6-tetraphenyl hexyl dianion was filtered and analyzed by tritiation to contain a carbon-barium content of 0.001 meq./g. of solution.

Styrene Polymerization 15 ml of above catalyst solution, 9.4 g. styrene in HMPA, ambient temperature for one day, ≈ 95 percent yield, broad MWD (GPC).

Butadiene Polymerization 15 ml. of above catalyst solution, 10.0 g. butadiene in HMPA, ambient temperature for one day, ≈ 85 percent yield, Gel.

EXAMPLE V

Polymerizations of propylene oxide, butadiene and styrene were conducted in polymerization reactors (bottles or tubes) under an inert atmosphere at various temperatures for different times. The polymerizations were conducted in solvent or in bulk. In some cases the solvent was removed from the catalyst before it was added to the reactor. All catalysts were prepared by the general methods of Examples I-III, above, in monomethyl amine which was then removed with or without first adding HMPA. Molecular weights and molecular weight distributions were compared by gel permeation chromatography (GPC). The polymerization conditions and results obtained are shown in the table below:

DISCUSSION OF DETAILS

In preparing the catalysts or initiators of the present invention, any alkaline earth metal can be used such as Be, Mg, Ca, Sr, Ba and Ra. However, it is preferred to employ barium and strontium since they give higher yields of the active catalyst form.

In preparing the catalyst, sufficient protic polar amine solvent is employed to dissolve the metal. Preferably, an excess of the protic amine is employed. When preparing catalysts at low temperatures, it is not necessary to use pressure equipment. However, pressure equipment can be employed, and the process of preparing the catalyst can occur at pressures of from about 0.25 to 10 atmospheres. During preparation of the catalyst it is desirable to agitate the reaction mixture during addition and reaction of the reagents. Further, it is preferred that an inert atmosphere, for example, helium, neon, or argon, should be over the reaction mixture at all times to prevent contact of the product with oxygen, water vapor or carbon dioxide. Of course, in place of the inert gas, the vapor of the organic compound and/or amine can be used as the "inert atmosphere". Closed reactors should be employed.

The protic solvent to be used in preparing the catalyst is selected from the group consisting of saturated aliphatic, cycloaliphatic and heterocyclic, primary and secondary, mono amines and polyamines and mixtures thereof, having from one to 36 carbon atoms and from one to five nitrogen atoms and being a liquid at a temperature of from about −100° to +50°C. and at a pressure of from about 0.25 to 10 atmospheres. Examples of such amines are methylamine, dimethylamine, ethylamine, n-propylamine, n-butylamine, n-amylamine, n-hexylamine, laurylamine, ethylene diamine, trimethylene diamine, tetramethylenediamine, pentamethylene diamine, hexamethylenediamine, di-n-propylamine, diisopropylamine, diethylamine, cyclohexylamine, N-butyl cyclohexylamine, N-ethylcyclohexylamine, N-methyl cyclohexylamine, p-menthane-1,8-diamine, diethylene triamine, cyclopentylamine, diamylamine, dibutylamine, diisoamyl amine, diisobutylamine, dioctadecylamine, dicyclohexylamine, ethylenimine, propylenimine, butylenimine, trimethyleneimine, piperidine, pyrrolidine, N,N'-diethyl ethylene diamine, N,N'-dimethyl ethylene diamine, butyl ethylamine, didodecylamine, dioctylamine, di-2-octyl amine, tetraethylene pentamine, 3-aminomethyl-3,5,5-trimethyl cyclohexylamine, and the like and mixtures thereof. Lower molecular weight amines are preferred since less is required to solvate the metal. Up to 50 percent by volume of the volume of the protic polar amine solvent can be diluted with a liquid hydrocarbon solvent having a pKa (MSAD scale) value of greater than about 35, e.g., toluene, xylene, heptane, etc.

Examples of weakly acidic organic compounds having pKa values of from about 15 to 35 and contemplated for use in accordance with the invention include: cyclopentadiene, indene, xanthene, 9-phenyl xanthene, triphenylmethane, acetylene, phenyl acetylene, 1,3,3-triphenyl propene, fluorene, 4 sym-tetraphenyl ethane, 9-phenyl fluorene, 9-(alpha naphthyl) fluorene, 9-(2-methoxy phenyl) fluorene, 9-(alpha naphthyl) xanthene, 9-(2-methoxy phenyl) xanthene, bis(2-methoxy phenyl)methane, 1,1,4,4-tetraphenyl butane, 1,1,2-triphenyl ethane, 1,1-diphenyl alkanes in which the alkane group has 1 to 10 carbon atoms such as diphenyl methane and 1,1-diphenyl ethane, alpha, alpha, omega, omega tetraphenyl alkanes in which the alkane group has not over 12 carbon atoms, and the like and mixtures thereof. The pKa value of the acidic hydrocarbon should be less than that of the protic polar amine solvent. Preferably, the proportion of acidic reagent should be 2 moles of acidic organic compound per mole of dissolved metal to produce monoanion catalyst and 1 mole of acidic organic compound per mole of dissolved metal to produce dianion catalysts although excess metal can be used.

The organo-metallic compound of this invention can be used as an initiator or catalyst for polymerization in solid form as such as in a slurry or solution form.

After formation of the organo-metallic catalyst of this invention, the protic solvent or amine is separated from the organometallic compound produced since the protic amine solvent can interfere with subsequent polymerization. Separation can be effected by evaporation or distillation, preferably under a partial or full vacuum to avoid decomposition. Alternatively, a solvent for only the amine or the organometallic compound can be added to the composition to effect separation of the amine from the organo-metallic compound. The added solvent should be inert with respect to the organometallic compound and should not react with the monomer during polymerization or cause chain transfer and so forth.

Preferably, the protic amine-free organic-metallic catalyst is added to aprotic polar solvent or dispersant. Di-alkoxyalkanes, e.g., 1,2-dimethoxyethane; 1,3-diethoxypropane; 1,2-dipropoxyethane; etc., and dialkoxypolyoxyalkanes, e.g., bis-(2-methoxyethyl) ether, ethylene glycol dimethyl ether, dimethyl ether of diethylene glycol, dimethylether of triethylene glycol, diethyl ether of dipropylene glycol, etc.; peralkyl phosphoramides, e.g., hexamethyl phosphoramide; octamethyl pyrophosphoramide, etc., are preferred solvents for use. However, other aprotic polar solvents that may be used include the dialkyl ethers, e.g., diethyl ether, dihexyl ether, etc., peralkyl alkylene polyamines, e.g., N,N,N′,N′-tetramethyl-ethylene diamine; N,N,N′,N′-tetraethyl 1,3-propylene diamine, etc., and heterocyclic ethers, e.g., dioxane, tetrahydrofuran, etc. Mixtures of these solvents can be used. Such aprotic polar solvents may be used alone or in admixture with liquid hydrocarbons of pKa value of greater than about 35 on the MSAD scale, e.g., benzene, toluene, xylene, heptane, hexane, cyclohexane, etc. and mixtures of the same. Such solvent mixtures may comprise 1–90 percent by weight of the hydrocarbon and preferably 5–25 percent by weight of the hydrocarbon. After addition of the aprotic solvent or solvent mixtures, the composition can be used for polymerization. In general, the maximum amount of catalyst concentration is about 1 mole of catalyst (or catalyst mixture) in 1 liter of the final solvent mixture. Operating temperatures for preparation of the catalysts range from about $-100°$ to $+50°C$., preferably from about $-100°$ to $+25°C$.

The preparation of organometallic compounds of alkaline earth metals in accordance with the invention proceeds with relative ease to produce high yield of desired product from readily available components. The resulting products have solubility in both aprotic polar solvents and non-polar hydrocarbons. The organic metallic compounds exhibit high degree of ionic characteristics making them initiators for polymerizable monomers. Furthermore, the persistency in solution of the resulting polymer carbanions permits the new polymerization initiators and procedures to be used for production of block copolymers of controlled configuration and with selected terminal functionalities.

Temperatures during polymerization can vary from about $-90°$ to $100°C$. The amount of catalyst employed will vary with the type of polymer desired. For example when making polymers having a high average molecular weight using a given amount of monomer and catalyst only a small amount of the catalyst is necessary whereas when making a low average molecular weight polymer larger amounts of catalyst are employed. Moreover, since the polymer is a living polymer, it will continue to grow as long as monomer is fed to the polymerization system. Thus, the molecular weight can be as high as a million, or even more.

The polymerization may be either a bulk (mass) or a solvent polymerization. In solvent polymerizations it is preferred to operate on a basis of not over about 15 percent polymer solids concentration in the solvent to enable ready heat transfer and processing. Solvents should be used which do not act as chain terminating agents. Polymerization should, of course, be conducted in a reactor fitted with a stirrer, heating and cooling means, means to pump in inert gas, monomer and catalyst, means to recover the polymer and so forth.

The polymer produced by the method of the present invention can be compounded and cured in the same manner as other plastic and rubbery polymers. For example, they can be mixed with sulfur or sulfur furnishing materials, peroxides, carbon black, $SiO_2$, $TiO_2$, $Sb_2O_3$, red iron oxide, phthalocyanine blue or green, tetramethyl or ethyl thiuram disulfide, benzothiazyl disulfide and the like. Stabilizers, antioxidants, UV light absorbers and other antidegradants can be added to these polymers. They can also be blended with other polymers like natural rubber, butyl rubber, butadiene-styrene-acrylonitrile terpolymers, polychloroprene, polyurethane elastomers and so forth.

The polymers produced by the method of the present invention can be used as paints, protective coatings for fabrics; in making fibers and textiles, body and engine mounts for automobiles, gaskets, tires, golf balls, golf ball covers, foamed plastic insulation for buildings, tote boxes, electric wire and cable insulation; and as plasticizers and polymeric fillers for other plastics and rubbers.

The embodiments of the invention in which an exclusive property or privilege is claimed are defined as follows:

1. The method of making an organometallic compound having an ionic carbon to metal bond and useful as a homogeneous anionic polymerization catalyst which comprises, at an operating temperature of from about $-100°$ to $+50°C$. under an inert atmosphere and in a protic polar amine solvent, reacting at least one alkaline earth metal with at least one weakly acidic organic compound having a pKa value of from about 15 to 35 on the MSAD scale and less than that of said amine solvent to form said organometallic compound and separating said amine solvent from said organometallic compound, said amine solvent being a liquid at a temperature of from about $-100°$ to $+50°C$. and a pressure of from about 0.25 to 10 atmospheres, said amine solvent being a saturated hydrocarbon amine having from one to 36 carbon atoms and from one to five nitrogen atoms, and being selected from the group consisting of aliphatic, cycloaliphatic, and heterocyclic, primary and secondary, mono and polyamines and mixtures of the same.

2. The method according to claim 1 in which there is additionally present during the reaction a liquid hydrocarbon solvent having a pKa value of greater than about 35 on the MSAD scale and in an amount by volume of up to 50 percent of the volume of the protic polar amine solvent.

3. The method according to claim 1 in which the operating temperature is from about $-100°$ to $+25°C$.

4. The method according to claim 1 in which the weakly acidic organic compound is selected from the group consisting of xanthene, cyclopentadiene, indene, 9-phenyl xanthene, triphenylmethane, acetylene, phenyl acetylene, 1,3,3-triphenyl propene, fluorene, sym-tetraphenyl ethane, 9-phenyl fluorene, 9-(alpha naphthyl) fluorene, 9-(2-methoxy phenyl) fluorene, 9-(alpha naphthyl)xanthene, 9-(2-methoxy phenyl) xanthene, bis(2-methoxy phenyl) methane, 1,1,4,4-tetraphenyl butane, 1,1,2-triphenyl ethane, 1,1-diphenyl alkanes in which the alkane group has from one to 10 carbon atoms, and alpha, alpha, omega, omega tetraphenyl alkanes in which the alkane group has not over 12 carbon atoms, and mixtures of the same and in which the metal is selected from the group consisting of barium, strontium and calcium.

5. The method of claim 4 where the metal is barium.
6. The method of claim 5 where the organic compound is xanthene.
7. The method of claim 5 where the organic compound is 1,1,2,2-tetraphenyl ethane.
8. The method of claim 5 where the organic compound is triphenyl methane.
9. The method of claim 5 where the organic compound is 1,1,4,4-tetraphenyl butane.
10. The method of claim 5 where the organic compound is 1,1,6,6-tetraphenyl hexane.
11.

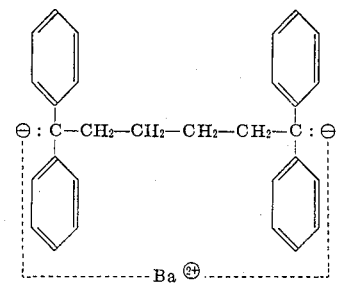

* * * * *

PO-1050
(5/69)

UNITED STATES PATENT OFFICE
CERTIFICATE OF CORRECTION

Patent No. 3,726,933          Dated April 10, 1973

Inventor(s) Richard R. Smith and Stuart D. Nielsen

It is certified that error appears in the above-identified patent and that said Letters Patent are hereby corrected as shown below:

Column 1, line 38, which reads: "J.A.C.S., 65, 268-1943)" should read ---J.A.C.S., $\underline{65}$, 268-1943)---.

Column 1, line 41, which reads: "(see Gilman et al., J.A.C.S. 67, 520-1945)" should read ---(see Gilman et al., J.A.C.S. $\underline{67}$, 520-1945)---.

Column 2, line 15, which reads: "(see J.A.C.S., 80, 5324-1958)" should read ---(see J.A.C.S., $\underline{80}$, 5324-1958)---.

Column 6, line 5, which reads: "$XA_nBaA_nX=$" should read ---$XA_nBaA_nX$ +---.

Column 6, line 26, which reads: "$P(Cl_2)=N=P(Cl_2)=N-P(Cl_2)=N$ should read ---$P(Cl_2)=N-P(Cl_2)=N-P(Cl_2)=N$---.

Column 6, line 39, which reads: "$XA_nEOBaOEA_n$ +" should read ---$XA_nEOBaOEA_nX$ +---.

Column 6, line 42, which reads: "$XA_nCOOBaOOCA_n$" should read ---$XA_nCOOBaOOCA_nX$---.

Column 6, line 46, which reads: "(Y-), e.g., $Ba^2$ + Y-" should read ---(Y=), e.g., $Ba^2$ + Y=---.

Column 6, line 48, which reads: "Y-$Ba^{2+}$+2nB ⟶" should read ---Y=$Ba^{2+}$+2nB ⟶---.

Column 7, line 1-22 should be deleted and retyped as written in the specification starting on page 12, line 17 to page 13, line 3, which reads as follows:

UNITED STATES PATENT OFFICE
CERTIFICATE OF CORRECTION

PO-1050
(5/69)

Patent No. 3,726,933    Dated April 10, 1973

Inventor(s) Richard R. Smith and Stuart D. Nielsen

It is certified that error appears in the above-identified patent and that said Letters Patent are hereby corrected as shown below:

(long chain glycol useful in reaction with mono or poly carboxylic acids to form esters or polyesters and with mono or polyisocyanates to form urethanes)

Where the homo-, co-, or block polymers of the present invention contain unsaturation and it is not desired to cure or graft at the unsaturated sites, they can be hydrogenated to eliminate or essentially eliminate this unsaturation using hydrogen and a suitable catalyst (palladium or triisobutyl borane).

DESCRIPTION OF THE PREFERRED EMBODIMENTS

The following examples will serve to illustrate the present invention with more particularity to those skilled in the art. In these examples and throughout the remaining specification and claims all parts and percentages are by weight unless otherwise specified. Also, in these examples all reactions and polymerizations were conducted in closed vessels under nitrogen, argon or neon (inert atmosphere).

PO-1050
(5/69)

UNITED STATES PATENT OFFICE
CERTIFICATE OF CORRECTION

Patent No. 3,726,933      Dated April 10, 1973

Inventor(s) Richard R. Smith and Stuart D. Nielsen

It is certified that error appears in the above-identified patent and that said Letters Patent are hereby corrected as shown below:

Column 7, line 27, which reads: "particularly" should read ---partially---.

Column 7, line 31, which reads: "(0.058 mole)" should read ---(0.0508 mole)---.

Column 7 and 8, Table I, 7th heading, which reads: "Conversion of Yield percent" should read ---Conversion or Yield---.

Column 7 and 8, Table I, 8th heading, Item 1, which reads: "Broad MID with high MI shoulder" should read ---Broad MWD with high MW shoulder---.

Column 8, line 5 which reads: "meg./gm." should read ---meq./gm.---.

Column 8, line 32, which reads: "hours" should read ---hour---.

Column 9, line 27, which reads: "≈95" should read ---∼95---.

Column 9, line 31, which reads: "≈85" should read ---∼85---.

Column 10, line 65, which reads: "form as such as" should read ---form as such or---.

In the Abstract, line 1, which reads: "Orgoanometallic" should read ---Organometallic---.

Signed and sealed this 25th day of December 1973.

(SEAL)
Attest:

EDWARD M. FLETCHER, JR.      RENE D. TEGTMEYER
Attesting Officer              Acting Commissioner of Patents